(12) United States Patent
Fox

(10) Patent No.: US 6,520,003 B1
(45) Date of Patent: Feb. 18, 2003

(54) FLUID LEAKAGE DETECTION DEVICE

(76) Inventor: Alan Fox, 27 Shoreham Drive, Rotherham (GB)

( * ) Notice: Subject to any disclaimer, the term of this patent is extended or adjusted under 35 U.S.C. 154(b) by 0 days.

(21) Appl. No.: 09/690,483

(22) Filed: Oct. 17, 2000

(51) Int. Cl.[7] ................................................ G01M 3/08
(52) U.S. Cl. ........................ 73/40.5 R; 340/611; 137/2
(58) Field of Search .......................... 137/2, 10, 624.11, 137/624.12, 456, 459, 460; 73/40, 40.5 A, 40.5 R; 340/611

(56) References Cited

U.S. PATENT DOCUMENTS

| | | | | |
|---|---|---|---|---|
| 4,647,914 A | * | 3/1987 | Alexander | 379/44 |
| 4,705,060 A | * | 11/1987 | Goulbourne | 137/102 |
| 4,730,637 A | * | 3/1988 | White | 137/62 |
| 5,040,409 A | * | 8/1991 | Kiewit | 73/40.5 A |
| 5,056,554 A | * | 10/1991 | White | 137/486 |
| 5,086,806 A | * | 2/1992 | Engler et al. | 137/486 |
| 5,251,653 A | * | 10/1993 | Tucker et al. | 137/460 |
| 5,287,884 A | * | 2/1994 | Cohen | 137/486 |
| 5,441,070 A | * | 8/1995 | Thompson | 137/1 |
| 5,503,175 A | * | 4/1996 | Ravilious et al. | 137/1 |
| 5,568,825 A | * | 10/1996 | Faulk | 137/624.11 |
| 5,728,940 A | * | 3/1998 | Kim et al. | 73/40.7 |
| 5,971,011 A | * | 10/1999 | Price | 137/460 |
| 6,101,451 A | * | 8/2000 | Smith et al. | 702/55 |
| 6,237,618 B1 | * | 5/2001 | Kushner | 137/1 |
| 6,321,773 B1 | * | 11/2001 | Ramsby | 137/209 |

FOREIGN PATENT DOCUMENTS

GB 2319634 A * 5/1998 ............ G01M/3/28

* cited by examiner

Primary Examiner—Hezron Wiilliams
Assistant Examiner—Charles D Garber
(74) Attorney, Agent, or Firm—Woodard, Emhardt, Naughton Moriarty & McNett

(57) ABSTRACT

A leakage detection device is provided for a fluid supply system. The detection device includes control means which can be selectively operated to close a valve and hence prevent further supply. The device includes at least one sensor which senses the flow of fluid through the supply system. Thus the device allows detection of fluid leakage and flow rates and can prevent or limit damage caused by fluid leakage.

24 Claims, 2 Drawing Sheets

FLUID LEAKAGE DETECTION DEVICE

The invention to which this application relates is a device for detecting fluid leakage in a fluid supply system such as, for example, a water supply in or to domestic premises. The device is provided to prevent the damage which leakage can cause by shutting off the supply of fluid when leakage is detected.

It is well known that leakage from fluid pipes can be extremely damaging in domestic premises and industrial premises and can cause damage to both apparatus, appliances in the premises and also to the fabric of the premises itself. The damage may also be caused to other premises if the fluid which is leaked causes ceilings to collapse and the like. The problem of leakage is particularly prevalent when the premises are empty and therefore leakages can go undetected for a period of time if, for example, the occupiers of the premises are on holiday, at work, or if indeed the premises are unoccupied.

There are known to be several different forms of devices which are provided to detect leakage but these known devices are relatively complex and require detection at various different points on the fluid system before the same is activated. The complexity and hence expense of these known devices such as for example that shown in GB2319634 which requires a plurality of flow sensors to be positioned throughout a premises means that there has been no large scale adoption of the same and as a result leakages still tend to go undetected.

The applicant has appreciated this problem and the aim of the present application is to illustrate in more detail the provision of a leakage detection device which is relatively simple to operate, can be fitted to existing fluid systems and can be operated and adjusted to suit particular conditions relating to the premises at any instant.

In a first aspect of the invention there is provided a leakage detection device for a fluid supply system, said fluid supply system comprising a mains supply connected to a distribution system and characterised in that said device allows the selective closure of the fluid supply wherein the device includes at least one sensor which senses the flow of fluid through the supply system and at least one valve which can be used to close and stop the fluid flow and control means which allows the selective closure of the at least one valve.

In one embodiment, the device includes a selectively operable control means to control at least one valve situated at the interface between a fluid supply and a distribution system, in the main supply system, or at various locations in the distribution system and the control means communicates with a number of flow sensors located throughout parts of the supply systems of concern so that for example, in a hotel there is provided a single selectively operable control unit on a mains water inlet with a sensor and control valve in each of the hotel rooms. The control means refers to each of the sensors at regular time intervals and if continued fluid flow is detected over a period of time, the valve for that particular location can be closed to prevent further flow. In a simpler example for a domestic premises, the valve can be fitted at the introduction of the mains water supply into the premises so that if fluid flow is detected at an unexpected time, the valve can be moved to a closed position to prevent further water entering the premises.

In a further embodiment, the leakage detection device is used on a mains supply system to control the mains supply to a number of different premises and to sense the supply of fluids to any of a number of premises.

In one embodiment, more than one control means ate provided to enable the device to be controlled from a number of locations in an area or premises. The control means can be provided at the mains inlet and/or remote from the mains inlet.

In use in one embodiment, when the device is activated, and the control means does not sense any liquid flow, the valve is retained in an open position. In one embodiment, when the control means is activated and does detect a liquid flow the sensor causes the valve to move to a closed position and thereby prevents any further liquid from passing into the system into the premises. In an alternative embodiment the control means is set to sense a particular level of fluid flow so that, when activated, if the sensor detects a fluid flow at a rate which is below that to which it has been set, then the valve will be maintained in an open position. If the flow rate detected exceeds the pre-set level, the control means will activate the valve and closes the same to prevent any further flow of fluid into the premises or, alternatively may activate the valve to move to a position to restrict the flow to below the pre-set level. In addition, or alternatively, instead of measuring a particular level of flow, the device may be operated, when activated, to allow the flow of liquid for predetermined periods of time equivalent to, for example, the periods during which liquid is required to be supplied to a washing machine. It should therefore be appreciated that in this embodiment, the device is activated when fluid flow rates are required to supply an appliance such as a washing machine or dishwasher. The fluid supply periods can be predetermined and entered into the device so that if fluid is supplied during the predetermined time periods the device remains in the open position but if fluid flow is sensed outside these time periods or for a longer duration than the predetermined time the device valve is moved to a closed position to prevent any further fluid from being supplied.

In a further aspect of the invention the device includes a control means which can be mounted within the premises and which allows the selective activation of the device and the particular control parameters for operation of the device to be entered by the user of the device of the premises or the owner of the premises.

For example, if the occupier is going on holiday for a period of time, say a weeks, then the device can be set to be activated for that period of time so that if leakage is detected during that time, the device valve will be closed to shut the fluid supply off. Equally, the device can be set to be activated every night between set periods of time or, in particularly cold climates, the device may be manually activated every time the occupier leaves the premises so that the danger which is caused by frozen pipes can be avoided and if it occurs, the supply of fluid can be stopped. Furthermore, if no flow is recorded or detected by the detection device, then the device is effectively disabled. Once a flow rate is detected, the detection device is re-activated.

Preferably the device includes a manually actuated "sensitivity switch" or button which when actuated by a user can set the system to a predetermined flow level detection which, in one example, may be to detect and act on any fluid flow detected. The switch is typically activated by a user in an emergency situation such as in the event of a flood or a leak in the system. When activated, the system detects fluid flow through the system and shuts the fluid supply off, thereby functioning as an emergency shut off switch.

In an alternative embodiment, the sensitivity switch can be used for maintenance purposes to the supply system and wherein the system in the premises typically has to be bled prior to maintenance work being undertaken. The system can be bled according to the invention by turning a tap from a closed to an open condition. This results in the device when activated sensing the flow and so acting to shut off the fluid supply to the premises. Thus with the tap in an open position, the existing fluid in the system is drained but as the valve of the device is now closed, this prevents further fluid from entering the system.

Preferably the sensitivity switch is provided on the control means.

In one embodiment a plurality of sensitivity switches are provided at accessible locations around the premises.

In an alternative embodiment, the device can be used to secure unoccupied premises whereupon the device can be fitted by the owner of the premises and activated and it will remain activated until the premises are to be reoccupied whereupon the device can then be removed or controlled as described above.

In a further feature the device can include in the control system a means whereby, when the batteries are low in power, the user is alerted. If the alerts are ignored then, before the power is totally exhausted, the device acts to turn off the fluid supply to the premises. This may also happen if there is a power cut and the device is powered from the mains.

In one embodiment, the leakage detection system can be connected to an alarm, such as a burglar alarm, to cause the same to sound in the event of a leak. The leakage detection system can also be connected to, integrated with and controlled via a personal computer. In one embodiment the system uses telemetry whereupon no wiring is required between the selectively operable control unit, the one or more sensors or the one or more valves.

In a further aspect of the invention there is provided a leakage detection device comprising at least one valve for the control of water entering into a water distribution system in a premises, at least one sensor for sensing the flow of water into and/or in the distribution system and a control means in communication with the sensor and valve, and wherein the valve is held in an open position when the control means is set to allow the flow of water through the system and into the premises, and the control means can be selectively controlled by a user to move the valve to a closed position for periods of time and/or upon receiving an indication of water flow when the control means is set to prevent the flow of water.

Specific embodiments of the invention will now be described with reference to the accompanying drawings, wherein.

Figure 1:
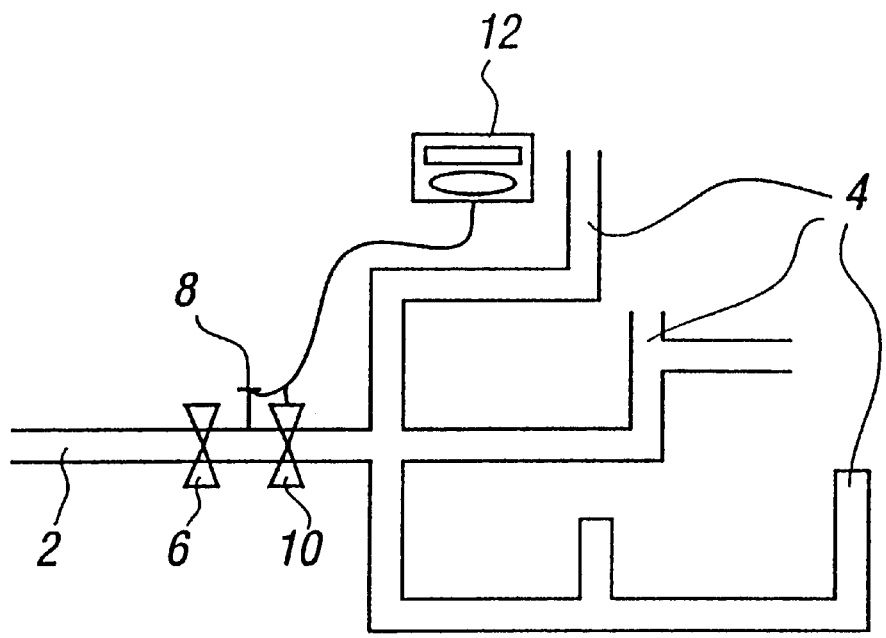
FIG. 1 illustrates in schematic fashion the device according to the invention.

Referring firstly to FIG. 1, there is illustrated a device according to this invention fitted in accordance with a fluid supply system which in this case is a water supply system and it is envisaged that the invention is of particular use with water supply systems. In this first embodiment there is shown a water supply system for a premises, said water supply system comprising a mains supply 2 and domestic water distribution system 4 which allow the distribution of the water throughout the premises and to various appliances. The mains supply is typically provided with a stop cock 6 and in the vicinity of the stop cock the water flow sensor 8 of the device can be fitted in conjunction with a valve 10 which may, in one embodiment replace the stop cock. The water sensor and valve are connected to the control means 12 mounted in the premises to allow the passage of data between the same and actuation of the valve, and which control means allows the control and activation of the water sensor and valve. Typically the valve is a solenoid valve and is held in a normal, open, position when the device is not activated and therefore allows unrestricted flow of water through the water system as normal. When activated, if no water flow is detected by the sensor through the pipes, then the valve is typically retained in an open position. In one embodiment if the device detects any water flow the valve is moved to a closed position to prevent the flow of any liquid from the mains into the premises supply system. In this embodiment the detection of liquid when the device is activated is taken to mean that there is a leakage somewhere in the premises supply system and that water is leaving the system through means other than the conventional tap or use by appliances. Thus, the closure of the valve prevents the further supply of water into the premises supply system and hence prevents further leakage into the premises.

An alternative embodiment is for the device when activated to be controlled such that the sensor is set to sense liquid flow for a predetermined period of time and if the water flow stops within the period of time then the valve will remain in an open position. If however the flow of liquid continues and exceeds the predetermined period of time then the valve will be moved to a closed position to prevent further water entering the premises. This particular arrangement is for use when, for example, the device is activated and an appliance which uses water such as a washing machine is in operation. For washing machines, water is supplied for predetermined periods of time and so the operation of the device to detect and allow water flow over predetermined periods of time allows the continued supply of water and allows the washing machine to be operational even when the device is activated. However, if water is flowing for a period greater than the predetermined period of time due to, for example, leakage, from the system or washing machine, then the device can still be activated to prevent further supply of water.

In a yet further embodiment, the control means of the device can be set to sense a particular level of water flow in a premises so that if the sensor detects a water flow at a rate which is higher than the pre-set level, the control means will activate the valve and close the same to prevent any further flow of water into the premises or at least restrict the flow of water into the premises. If the sensor detects a water flow at a rate which is below the pre-set level, the valve remains open.

Figure 2:
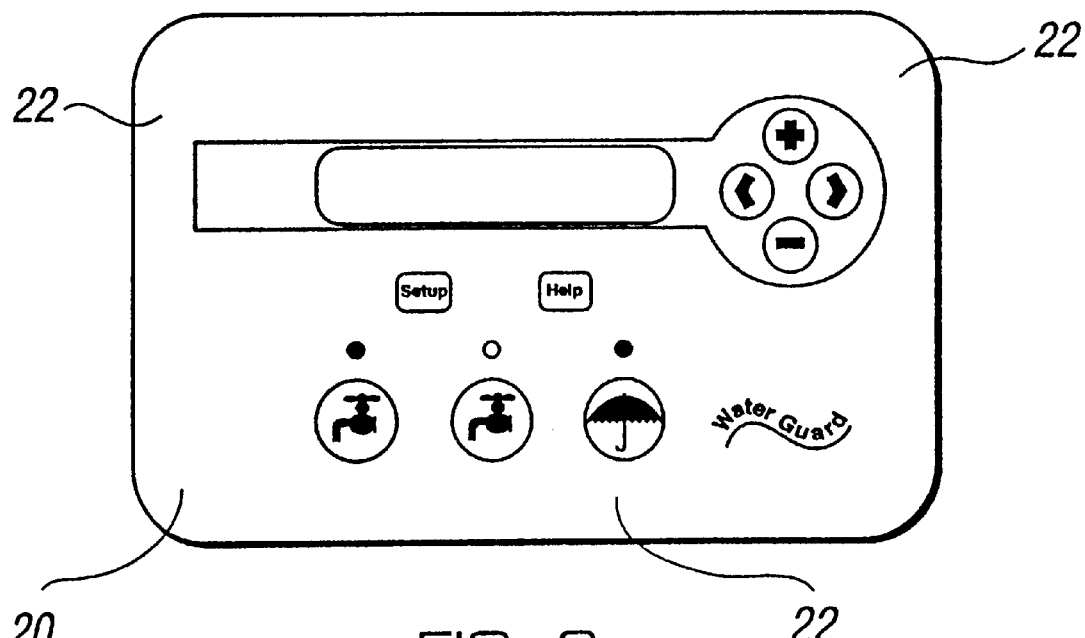
FIG. 2 illustrates a control panel for the control means of the invention.

FIG. 2 illustrates a control means panel 20 according to one embodiment of the invention wherein there are provided various means 22 by which the user may input control parameters for the device and which allows the device to be controlled to suit the particular requirements of the occupier of the premises in terms of when the device should be activated, whether it should be activated at the same time on repeated occasions and so on.

The device can be activated when the premises are unoccupied so as to avoid the conventional situation where any leakage would not be detected for a period of time and/or when the premises are occupied and the occupier may be asleep for example.

As part of the control means panel 20, a sensitivity switch can be provided which when actuated manually by the user can move the system from no or a lower level of sensitivity of water flow to a higher level of sensitivity in which relatively small flows of water are detected. This allows the switch to be used as a shut down switch in the event of an emergency such as a flood or leak. On manual actuation of the sensitivity switch, flow sensor 12 senses water flow in the system as normal and the valve 10 is shut down. The switch can also be used to allow maintenance work to be carried out. Once the switch is actuated, if a tap in the premises is then turned on in order to bleed the system and allow maintenance, the flow sensor 12 detects an increase in flow and switches off valve 10. If the tap is kept in an open position, the water in the supply system in the premises pipes are drained while the valve 10 prevents further water from entering the premises, so allowing maintenance to then take place.

Figure 3A:
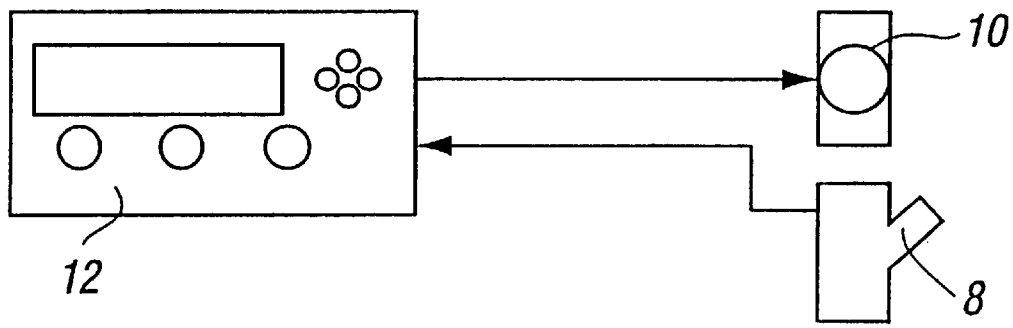
FIG. 3a illustrates a schematic representation of one embodiment of the invention.
Figure 3B:
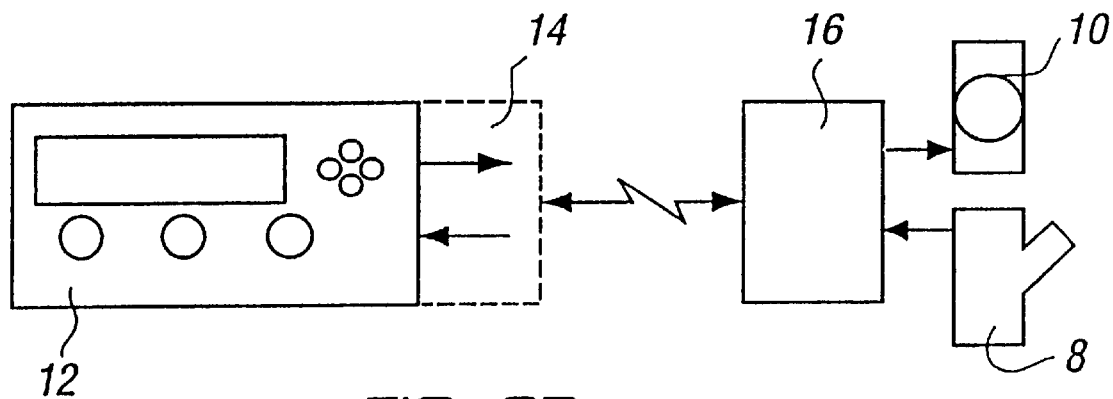
FIG. 3b illustrates a schematic representation of a further embodiments of the invention.

The device according to the invention can be hardwired to the one or more valves and flow sensors, as illustrated in FIG. 3a. Alternatively, the device can operate using telemetry wherein no wiring is required, as illustrated in FIG. 3b. The control means 12 is thus provided with a radio transmitter and receiver 14 and the valve 10 and flow sensor 12 also communicate with a radio transmitter and a receiver 16.

Thus, there is provided a device which can be used to advantage by the occupiers of premises, the owners of premises which may be unoccupied for a period of time and may be provided by water supply companies to allow detection of leakage and/or may be required by insurance companies as a means of preventing or limiting damage which is caused by fluid leakages.

What is claimed is:

1. A leakage detection device for a mains water supply system, said supply system comprising a mains water supply connected to a distribution system within a premises, wherein the device allows the selective closure of the water supply and said device includes a sensor which senses the flow of water through the supply system and at least one valve which can be controlled to close and stop the water flow to the supply system, and control means which allow the selective closure of the said valve in response to the sensor and wherein the sensor and valve are connected to the control means with the device being selectively operable in active and inactive conditions and the said valve is held in a normal, open position, when inactive and, when active, the valve remains in an open condition when no water flow is detected by the sensor, said valve moving to a closed condition when water flow is detected by the sensor at an unauthorized time, and;

wherein the control means has a signaling means to alert the user to any, or any combination of, fluid flow has been detected at an unauthorized time, or at an unauthorized level and the valve has been closed; that a power supply to the device has failed or is decreasing, in which case the device goes to a failsafe closed position.

2. A leakage detection device according to claim 1 wherein the control valve is fitted at the interface between the mains supply and a distribution system and communicates with a plurality of flow sensors located throughout the distribution system.

3. A leakage detection device according to claim 2 wherein the control means includes a manually actuated switch which when actuated sensitizes the at least one sensor so that when a valve in the distribution system is opened, at least the control valve is moved to a closed position.

4. A leakage detection device according to claim 1 wherein the device is used on a mains supply system to control the mains supply to a plurality of different premises and to sense the supply of fluid thereto.

5. A leakage detection device according to claim 1 wherein one or more valves are provided to control the supply system.

6. A leakage detection device according to claim 1 wherein at least one of the valves is fitted at the mains inlet.

7. A leakage detection device according to claim 6 wherein the at least one control means is remote from the mains inlet.

8. A leakage detection device according to claim 1 wherein when the device is activated, and the at least one sensor does not sense any fluid flow, the at least one valve is retained in an open position.

9. A leakage detection device according to claim 1 wherein when the at least one sensor is activated and detects a fluid flow, the at least one sensor causes the corresponding at least one valve to move to a closed position to prevent further fluid flow.

10. A leakage detection device according to claim 9 wherein the control means is set to move the at least one valve from an open to a closed or partially closed position upon the detected fluid flow rate reaching a predetermined fluid flow rate.

11. A leakage detection device according to claim 10 wherein when a flow rate which exceeds the pre-set level is detected, the sensor activates the at least one valve and closes the supply.

12. A leakage detection device according to claim 10 wherein when a flow rate which exceeds the pre-set level is detected, the sensor activates the at least one valve to move it to a position to reduce the flow rate to below the pre-set level.

13. A leakage detection device according to claim 1 wherein the control means includes a manually actuated switch which when actuated allows automatic activation of the at least one sensor to detect fluid flow, the at least one sensor causing the at least one valve to move to a closed position to prevent further fluid flow, when flow is detected.

14. A leakage detection device according to claim 1 wherein the parameters for the control means are set by the user and can be activated/deactivated as often as required.

15. A leakage detection device according to claim 14 wherein time periods during which fluid flow is permitted can be input into the control means.

16. A leakage detection device according to claim 15 characterized in that when the control means is set at an off or noncontrolling state the at least one valve remains in an open position.

17. A leakage detection device according to claim 15 wherein if fluid flow is sensed when the control means is active and is therefore outside the predetermined fluid flow time, or exceeds the predetermined fluid flow time, the valve is moved to a closed position.

18. A leakage detection device according to claim 1 wherein if no fluid flow is sensed the device is effectively disabled in an open position, until fluid flow is detected.

19. A leakage detection device according to claim 18 wherein once a flow rate is detected, the detection device is reactivated.

20. A leakage detection device according to claim 1 wherein the device is provided in a premises to prevent the flow of water from a trains water supply into the distribution system in the premises.

21. A leakage detection device according to claim 1 wherein the device is connected to an alarm to sound in the event of a leak.

22. A leakage detection device according to claim 1 wherein the control means is connected to, integrated with or controlled via a personal computer.

23. A leakage detection device according to claim 1 wherein the device uses telemetry whereupon no wiring is required between the control means, the one or more sensors and/or the one or more valves.

24. A leakage detection device according to claim 1 wherein the device has wiring between the control means, the one or more sensors and/or the one or more valves.

* * * * *